C. E. ARUNDEL.
COOKING STOVE.
APPLICATION FILED AUG. 4, 1919.

1,371,191.

Patented Mar. 8, 1921.
3 SHEETS—SHEET 1.

Witness
S. E. Cooley
A. L. Cooley

Inventor
Clarence E. Arundel
By Clarence E. Arundel
Attorney

C. E. ARUNDEL.
COOKING STOVE.
APPLICATION FILED AUG. 4, 1919.

1,371,191. Patented Mar. 8, 1921.
3 SHEETS—SHEET 2.

Inventor
Clarence E. Arundel

Witness
S. E. Cooley
A. L. Cooley

By Clarence A Arundel
Attorney

C. E. ARUNDEL.
COOKING STOVE.
APPLICATION FILED AUG. 4, 1919.
1,371,191.
Patented Mar. 8, 1921.
3 SHEETS—SHEET 3.
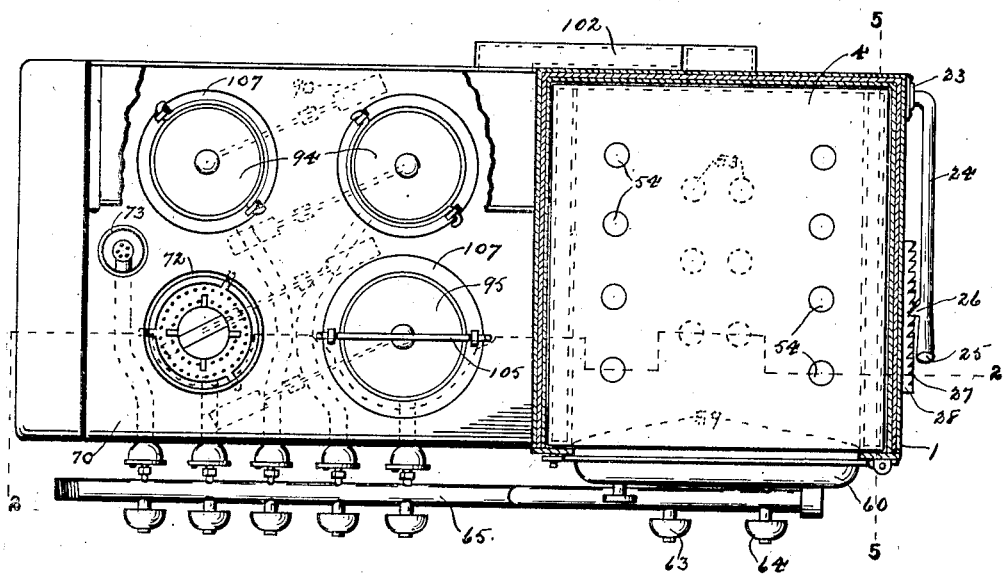
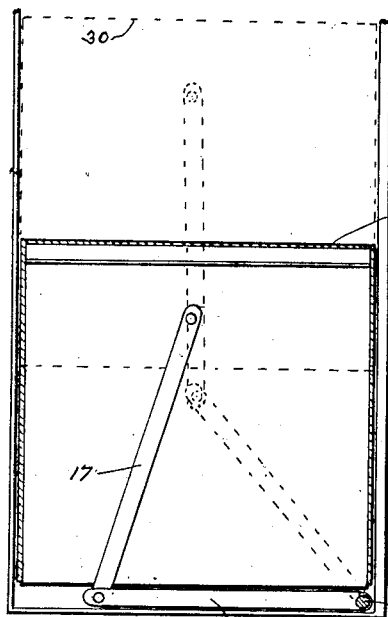
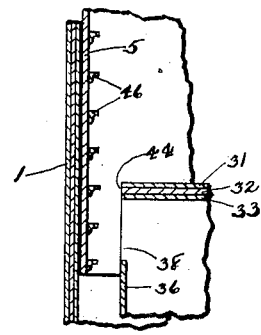
Inventor
Clarence E. Arundel
By Clarence E. Arundel
Attorney
Witness
S. E. Cooley
A. L. Cooley

UNITED STATES PATENT OFFICE.

CLARENCE E. ARUNDEL, OF TALLADEGA, ALABAMA.

COOKING-STOVE.

1,371,191.   Specification of Letters Patent.   Patented Mar. 8, 1921.

Application filed August 4, 1919. Serial No. 315,103.

*To all whom it may concern:*

Be it known that I, CLARENCE E. ARUNDEL, a citizen of the United States of America, residing at Talladega, in the county of Talladega and State of Alabama, have invented certain new and useful Improvements in Cooking-Stoves, of which the following is a specification.

The present invention relates to means for cooking and provides for the use of the least amount of heat necessary to cook with.

The invention further provides for the use of an adjustable oven which may be adjusted to conform to the size of the article to be cooked, whether a very large dinner or a very small pie, thus utilizing only the amount of heat space necessary to cook various articles.

The invention further provides for the elimination of heating unused space in an oven where nothing is being cooked, thus saving heat and gas, or other fuel.

The invention further provides in the adjustable oven, space sufficient to cook an extra large dinner, or an amount of food at one time, doing away with two separate bakings, allowing a very large baked meal to be served from the oven hot without allowing previous cooked articles to get cold before serving.

The invention further provides for the use of an adjustable warming closet, heated either from the regular cooking top or baking oven.

The invention further provides for an adjustable burner to be adjusted to the article containing food to be cooked.

The invention further provides for food vessels that set down in a recess, forming a wall around the said vessels, but spaced apart a distance for the upward passage of the heat from the burner for the purpose of conforming to and forcing the passage of the heat along the vertical wall of the vessels.

The invention further provides a kitchen heater, by inclosing the vessel container walls as a radiator, to utilize the heat passing through the walls for heating the kitchen in winter. The air intake and air outlet in the kitchen heater opening into the kitchen can be closed in summer and the lost heat sent through the vent pipe by opening outlet in the top of kitchen heater, giving a cool kitchen. All outlets in the kitchen heater can be closed, creating a dead air space which forms a heat insulation, which action causes a small amount of lost heat to pass through the vessel container walls and the heat is then forced along the food container to heat same and into the vent pipe.

The invention especially provides for an adjustable burner, which automatically at all times adjusts itself to the bottom of a food container any distance down in the burner compartment and has a normal position at the cooking top.

In the drawings forming a part of this specification I have shown the invention in the forms I consider the best, however the invention can be embodied in other forms and with the appended claims I intend to cover the invention in any form in which it can be embodied.

In the accompanying drawings forming a part of this invention,

Fig. 3 is a horizontal cross section of the adjustable oven showing also a plan view of the cooking top taken on the line 3—3 of Fig. 2.

Fig. 5 is a vertical cross section of a part of the adjustable oven to show certain parts taken on the line 5—5 of Fig. 3.

Fig. 6, is a part vertical cross section of a modified form of the adjustable oven, showing single side walls formed with the same oven top as shown in Fig. 2; the inner side oven walls as shown in Fig. 2 are not used in this form, only using the outer side oven walls with the oven racks thereon, forming a single side wall oven instead of a double side wall oven.

Similar reference numerals refer to similar parts throughout the drawings.

Figure 1:
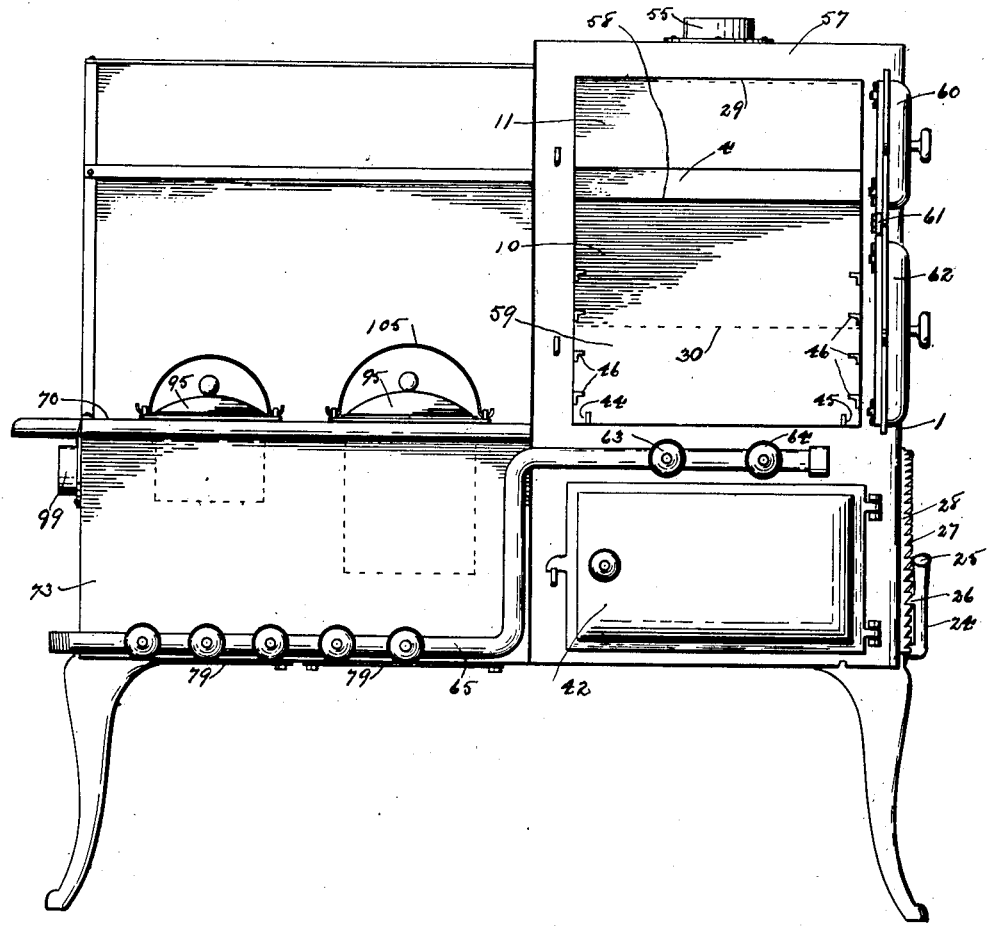
Figure 1 is a side elevation of the cooking stove.

The cooking stove is formed with an oven body 1 (Figs. 1 and 2) around the back and two sides with a wall 57 at the front forming the oven openings when a single lined oven is used, when a double lined oven is used the heat resisting material 2 and inner lining 3 are formed with the outer body 1.

Formed inside of the stationary oven body is the adjustable or removable oven top 4, which can be made alone or with a single side casing 5 (Fig. 6), however the preferred form is shown with an inner casing 6 (Fig. 2) spaced apart from the outer casing 5 forming heat passages 7 and 8 between. A heat passage similar to 7 and 8 can be formed at the back of the oven 4 but it is not necessary, only adding to the manufacturing cost, and is herein not shown in the preferred form.

Oven casings 5 and 6 are preferably secured together with the top 4 by a brace 16, which brace is formed to close the ends of the space, forming a heat retarding chamber 9 above the oven interior 10. Heat passages 7 and 8 are closed at the top by wall supporting braces 14 and 15 and left open at their bottoms at 12 and 13.

The inner oven casing 6 has heat inlets and outlets 48, 49, 50, 51 and 52 formed in the side walls 6 and heat outlets 53 in the top thereof into chamber 9, which will be later described. The outer oven casing 5 has heat outlets 54 formed in the top thereof.

The oven 4 is supported by rods 17 and 18 pivoted to the side walls thereof, which rods are pivoted to arms 18' and 19, secured to a shaft 20 which is mounted in bearings 21 and 22 at each end. The shaft 20 extends through the oven body 1 through a flange 23 (Fig. 3) and has mounted on the end thereof a hand operating lever 24 with a handle 25 at its end. Preferably formed on the lever 24 is a tooth 26 to engage and rest at any desired tooth 27, formed in a plate 28 which is secured to the wall of body 1, Fig. 3.

Through the medium of handle 25, lever 24, shaft 20, arms 19 and 18', rods 17 and 18, the adjustable oven 4 has a vertical movement at a desired distance within the body 1, designated at 29 and 30 as the movement of oven interior 10, which movement forms an adjustable warming closet 11 between the top of oven 4 and top of body 1. The same movement also spaces the top of the oven interior 10 from the oven bottom 31 any desired distance which forms an adjustable oven. The oven bottom 31 is preferably formed on heat retarding materials 32 and 33, which are secured to a casing 34 which is secured to a bottom casing 35. The casing 34 forms the broiler oven and formed in the side walls 36 thereof are the heat passages 38 and 39 for the passage of heat from burners 47 into the oven 10.

Walls 36 have racks 40 for the support of a broiling pan 41 near the top and a perforated plate 43 forming the bottom of the broiler oven. The oven bottom 31 is formed at its ends to have vertical walls 44 and 45, which walls are formed a distance to permit of the engagement at all times of one of the racks 46 in each, to at all times close the openings made between the bottom 31 and wall 6, which openings permit the movement up or down of the oven racks 46. The continued closing of these openings along walls 44 and 45 forces the heat from the burners 47, to pass through the openings 49, 50, 51, 52 or into openings 12 and 13, which may be in registration with the level of the burner 47, into the heat passages 7 and 8, that the heat may rise in these passages and enter the oven at the top, to insure a baking oven hotter at the top in oven 10, that at the bottom 31, to obtain better baking.

Figure 2:
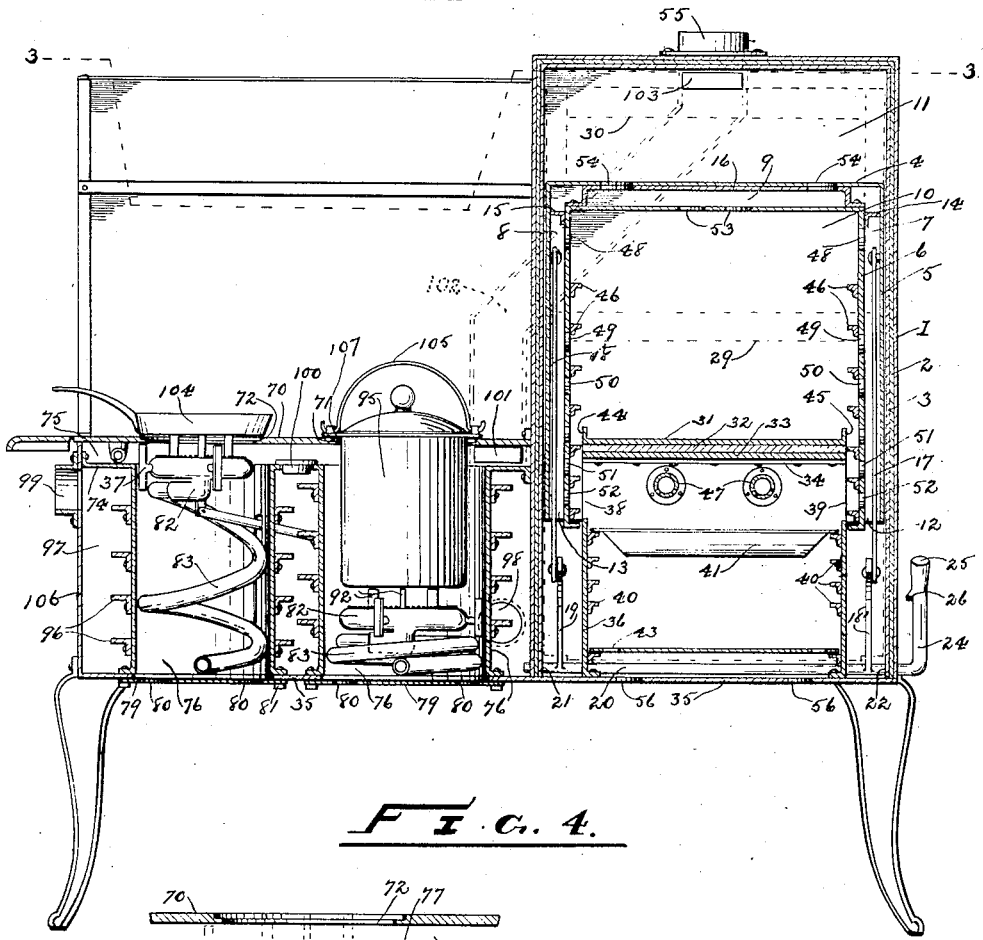
Fig. 2 is a vertical cross section taken on the line 2—2 of Fig. 3.

It is readily seen, Fig. 2, that the oven heat openings 48, 49, 50, 51, 52 and openings 12 and 13, are arranged to permit of the entrance of the heat into the oven 10, and to receive through said openings the heat from the burners 47 at whatever place the operator may set the desired baking space of oven 10 at the distance between the moving spaces 29 and 30. The burners are individually operated with valves 63 and 64 formed on a manifold 65.

The circulation of the oven is secured with air openings 56 in the bottom plate 35 for air to the burners and circulation, passing through the described adjustable oven opening into oven 10, through outlets 53 into chamber 9, through outlets 54 into the warming closet 11, and finally out vent pipe 55. The adjustable oven is formed to have an opening in the front part (Figs. 1 and 3), formed with sides 59 and top 58, which permit of the use of placing food to be cooked therein, which opening is in registration with a similar opening in wall 57, which opening is closed with one or more doors. The doors are formed in a manner that either the top door 60 or the lower door 62, may be opened independent of each other as desired, with a hinged brace 61 formed to rest under the door flanges to prevent the escape of heat and to be either opened or left closed.

When the adjustable oven is being used high up, the opening of the doors 60 and 62 and hinged brace 61 at once give a large opening the full size of the oven with nothing in the way of taking food out or putting same in. The lower door 42 permits entrance to broiler oven before described.

The cooking top 70 (Fig. 2) may be formed with the open grate top but it is herein shown with the preferred closed top with a large opening 71, regular openings 72 and simmer openings 73, which are closed with lids when not in use.

The object of the adjustable burner with its associated parts is to confine and utilize as much heat as possible with a circulating heat, therefore the use of the closed top is preferred. Formed underneath and near the top 70 and secured to stove wall 106 is a horizontal wall 74, which forms a shallow heat circulating chamber 75 for the purpose of confining the heat to the top 70, having a vent outlet 101, in wall 106, through vent pipe 102 to vent 55. The vent 102 in this form of the invention is shown entering the warming closet at opening 103 therein for the purpose of having a heated warming closet from the top burners when the oven is not in use, before passing heat in vent 55.

Figure 4:
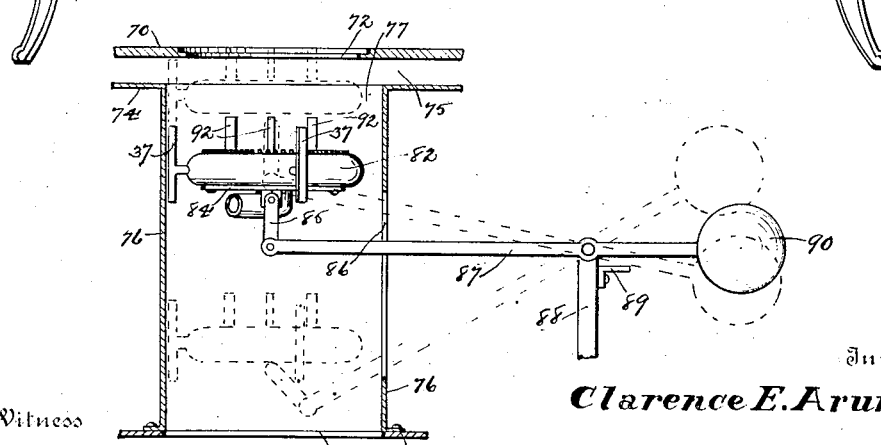
Fig. 4 is a vertical cross section of a part of the cooking top, showing the adjustable burner and the burner compartment.

Formed below the outlets 71 and 72 in top 70 (Figs. 2 and 4), are curvilinear formed burner compartments 76, with a heat outlet 77 at the top and an opening 78 at the bottom for the purpose of removing the burners 82 for cleaning, by removing plate 79, with air inlets 80, by fasteners 81 from lower wall 35. A drip pan (not shown) may be installed below the plate 79. Movably mounted within the curvilinear formed walls 76 are the adjustable burners 82, which are secured to a plate 84, which plate is pivoted to a rod 85, which rod is pivoted to an arm 87 at one end extending through slot 86 in wall 76, with a weight 90 at its other end and movably secured in a bearing to a brace 88 secured to the lower wall 35. The burner has secured thereto guide arms 37 for the purpose of holding the burner in a horizontal plane as they frictionally engage the side walls of the compartment 76, as the burner is moved up or down, through the medium of a cooking utensil bottom engaging the burner lugs 92, to operate the burner position. The burner lugs 92 are the distance necessary for complete combustion from the gas holes in burner to the cooking utensil bottom.

Connected to the burners 82, is a flexible gas tubing 83, preferably metallic, which is of sufficient length to allow for the movement of the burner from top to bottom of wall 76, and is connected to each individual gas controlling valve on the manifold 65 for operation. A lug 89 secured to the brace 88 engages the arm 87 to prevent the passage of the burner lugs 92 above the top 70 when an open top is used, however when the solid top is used, the top ends of guide arms 37 engaging the top 70 serve this purpose. The adjustable burner is formed to have an automatic movement by having the weight of part 90 secured to the lever arm 87 greater than the burner with its accessories, thus the burner will automatically stay at the cooking top 70 in position for frying or other cooking as shown by pan 104, when burner is not moved downward, and will always retain a position engaging the bottom of any depth kettle any depth down in the burner compartment 76, as shown by different depth kettles 95. The cooking utensil 95 is formed with a handle 105, or similar handle, for removing or placing same down into the burner compartment 76, with a kettle flange 107 closing the opening 71 or 72 of top 70 to permit no escape of heat. The vertical wall of the compartment 76 is spaced a distance from the kettle 95, forming a heat passage for the purpose of confining the heat against the vertical wall of the kettle to utilize the upward passage of the heat from the burner. The outside of the heat confining walls of the compartment 76 are used as a radiator or kitchen heater and are preferably used with radiator flanges 96 secured thereto, to utilize the heat passing into the compartment 97. This compartment 97 formed by walls 74, 35 and 106 with the compartments 76 formed therein, can be utilized in three different ways.

In winter months the cold air inlet 98 permits the air to enter for heating and is sent out hot through hot air outlets 99 for kitchen heating.

In summer months the inlet 98 is left open and the outlet 99 is closed, the outlet cap 100 formed in the wall 74 is removed, thus the hot air has outlet access to help heat the cooking top into space 75 to vent 55.

The openings 98, 99 and 100 may all be closed to form a dead air space which forms an insulation, the heat passing through compartment walls 76 is then minimized and is forced on cooking utensils like 95.

In a modified form of my invention, Fig. 6 is a part vertical cross section of a modified form of the adjustable oven formed with a single side wall 5 spaced away for entrance of heat at 44 from the oven bottom 31. The operating of this form is the same as the preferred form.

Having thus described my invention, what I claim as new and desire to secure by Letters Patent, is:—

1. The combination with the walls of a stove and with an oven bottom, of a movable oven formed with a top and with side walls, provided with a heat inlet and outlet, an opening, the said opening formed between the side walls of the stove and the said oven bottom, the said side walls disposed and movable in the said opening.

2. The combination with the walls of a stove and with a stationary oven bottom, of a movable oven formed with a top and with side walls, provided with a heat inlet and outlet, the said oven mounted on mechanical means to adjust the said top and side walls with the said stationary oven bottom, and means formed on the outer wall of the said stove connected with the said mechanical means to adjust the oven to a plurality of positions with respect to the said bottom to vary the oven interior.

3. The combination with the walls of a stove, of an oven with a top and side walls movable together, provided with an inlet and with an outlet, a stationary oven bottom, the said oven top and side walls adjustable in the stove with respect to the said stationary oven bottom, and mechanical means to adjust the oven to a plurality of positions with respect to the said bottom to vary the oven interior.

4. The combination with the walls of a stove, of an oven with a top and with side walls formed to be movable together, provided with an inlet and with an outlet, oven rack holders formed on the said side walls, a stationary oven bottom, the said oven top and side walls adjustable with respect to the said stationary oven bottom to vary the oven interior, and means to heat the said oven.

5. The combination with the walls of a stove, of an oven formed with a top and with inner and outer side walls, separated to form a heat passage, the inner walls provided with inlets, the top provided with outlets, a stationary oven bottom, the said top and side walls movable together and adjustable with respect to the said stationary oven bottom to vary the oven interior.

6. The combination with the walls of a stove, of a movable oven disposed therein formed with a top and with side walls, a substantially stationary oven bottom disposed within the said movable oven and adjacent the said side walls, and means to move the said oven whereby the said side walls will move up or down and above or below the said oven bottom.

7. The combination with the walls of a stove, of an oven formed with a top and with side walls provided with a heat inlet and outlet, the said top and side walls disposed to be moved in different vertical positions within the said walls of a stove, a stationary oven bottom, an opening formed in one of the said side walls adjacent a door opening formed on said wall of stove, being arranged to provide access into said oven, and means to adjust the oven to a plurality of positions with respect to the said bottom to vary the oven interior.

8. The combination with the walls of a stove, of an oven disposed therein formed with a movable top and with movable side walls, provided with a discharge outlet, a stationary oven bottom disposed within the said oven, an opening, the said opening formed between the said walls of the stove and the said oven bottom, the said movable side walls disposed to be movable in the said opening above and below the said oven bottom, an inlet to admit the products of combustion into the oven interior, means to move the said top and side walls, and means to heat the said oven.

9. The combination with the walls of a stove and with a substantially stationary oven bottom, of a movable oven formed with a top and side walls, the said top formed with an outlet, the said side walls formed with an outer and with an inner wall, providing a heat passage between, the inner wall having horizontal openings at different points, the said openings formed to be moved above or below the said oven bottom, means to heat the said oven, and means to move the said oven, whereby the said openings will act either as inlets or outlets of the products of combustion passing in or out of the said heat passage.

10. The combination with the walls of a stove, of an oven formed with a movable top and with movable side walls, provided with a heat inlet and outlet, the said side walls provided with oven rack holders, a stationary oven bottom disposed within the said oven, an opening, the said opening formed adjacent the said side walls and said oven bottom, means to move the said oven, whereby the said side walls and the said oven rack holders are movable in the said opening and pass above or below the said oven bottom.

11. The combination with the walls of a stove having an oven door and with a stationary oven bottom, of a movable oven disposed between the said walls of the stove and the said oven bottom, the said oven formed with a top and with back, front and side walls, provided with a heat inlet and outlet, an opening, the said opening formed in the front wall of the said oven to provide access into said oven, means to move the said oven, whereby it is movable adjacent the front wall and oven door of said stove.

12. The combination with the walls of a stove, of an oven interior having movable side walls, a substantially stationary oven bottom, an opening, the said opening formed adjacent the outer horizontal edge of the said oven bottom between the walls of the stove and the said oven bottom, the said movable side walls disposed in the said opening, and movable in the said opening adjacent the said oven bottom.

In testimony whereof I affix my signature at Birmingham, in the county of Jefferson, and State of Alabama, this 30th day of July, 1919.

CLARENCE E. ARUNDEL.

Witness:
NOMIE WELSH.